United States Patent [19]

Mora et al.

[11] Patent Number: 5,122,265

[45] Date of Patent: Jun. 16, 1992

[54] COMPACT REVERSE OSMOSIS SYSTEM WITH COLD WATER FLUSH

[75] Inventors: Henry F. Mora, Camarillo; Ronald J. O'Hare, Agoura Hills, both of Calif.

[73] Assignee: HOH Water Technology Corp., Newbury Park, Calif.

[21] Appl. No.: 728,897

[22] Filed: Jul. 10, 1991

[51] Int. Cl.⁵ .............................................. C02F 1/44
[52] U.S. Cl. .................... 210/134; 210/257.2; 210/259
[58] Field of Search ............... 210/134, 257.2, 259, 210/321.69

[56] References Cited

U.S. PATENT DOCUMENTS 4,880,535 11/1989 Burrows .................. 210/255 X

*Primary Examiner*—Frank Spear
*Attorney, Agent, or Firm*—James A. Quinton; Frank Frisenda, Jr.

[57] ABSTRACT

A reverse osmosis purification system is operated on a ratio of approximately 1 to 1 to 2 to 1 waste water to product water. The system uses the cold water outlet and a cold water path which extends through the RO membrane to remove non-migrating particles trapped on the outside of the reverse osmosis membrane to remove salts from the membrane and allow to prolong the life of the membrane despite low brine to pure water ratio.

8 Claims, 6 Drawing Sheets

COMPACT REVERSE OSMOSIS SYSTEM WITH COLD WATER FLUSH

BACKGROUND OF THE INVENTION

1. Field of the Invention

The field of the invention is reverse osmosis (RO) purification devices. In particular the invention relates to a reverse osmosis purification system which operates on a high ratio of purified water to waste water output.

2. Description of the Prior Art

Reverse osmosis (hereinafter referred to as RO) devices are well known as useful water purification vehicles. Often RO devices have a high ratio of waste water to purified water. In reverse osmosis devices, it is necessary to rinse the surface of the membrane from non-migrating particles to retard buildup of scale which can foul the membrane and require either replacement of the cartridge or costly chemical treatment. In order to reduce scale formation and to retard the buildup of solid materials on the membrane, prior art devices have tended to use a high waste water to purified water ratio to flush non-migrating particles from the membrane. However, such large wastage of water in a ratio of 5 to 1 waste (or brine) to purified water or higher cannot be tolerated in areas where water is at a premium. See e.g., U.S Pat. No. 4,814,086.

A great variety of organic and inorganic compounds collect on the surface of reverse osmosis membranes from the passage of the contaminated feed streams across the membrane surface. These contaminants when they collect on the membrane reduce the flow of water through the membrane. As a result when the membrane is fouled, the membrane must be either replaced or cleaned.

Chemical cleaning has been used, but it requires flushing the membrane with chemicals which is time consuming and expensive. Ultrasonic energy systems have been proposed to vibrate the fluid and thereby clean the membranes. Care must be taken in ultrasonic cleaning of the membrane not to destroy the membrane from the wave vibrations. The use of ultrasonic cleaning transducers however, significantly increase the complexity of the device. U.S. Pat. No. 4,253,962 is an example of an reverse osmosis system containing a ultrasonic vibratory cleaning system.

Flow controllers which allow controlled volume of water flow are known for use as emitters in irrigation. See for example, U.S. Pat. No. 4,869,432.

SUMMARY OF THE INVENTION

The present invention is directed to an improved reverse osmosis purification system which allows the reverse osmosis system to be run on a ratio of approximately 1 to 1 to 2 to 1 waste water to product water. According to the invention a compact reverse osmosis purification system for delivering purified water to a purified water faucet is provided. The system uses the cold water outlet and a cold water path which extends through the RO membrane to remove non-migrating particles trapped on the outside of the reverse osmosis membrane.

A reverse osmosis vessel is provided which includes a reverse osmosis (RO) membrane and a water inlet and a purified water outlet for water exiting a purified water path. Water not permeating through the membrane travels through the reverse osmosis brine path and exits the reverse osmosis brine outlet. Water is supplied to the reverse osmosis unit through a water supply line. Purified water exits the reverse osmosis purified water outlet and then travels along the purified water path, preferably a conduit or hose leading to a pressurizable purified water storage tank. Desirably this tank is of the bladder type construction. When the tank is filled with water, the bladder expands and pressurizes the gas between the bladder and the inside tank wall. The purified water storage tank is then connected to the purified water faucet which supplies drinking water on demand.

The brine outlet from the reverse osmosis vessel leads to a first brine path and a second brine path. The first brine path connects the brine outlet to any convenient drain. A brine flow control valve is located on the brine path between the reverse osmosis brine outlet and the drain to control and regulate the flow of brine through the reverse osmosis vessel. This control valve desirably is of the diaphragm type having a design which allows for a controlled predetermined amount of brine flow for a variety of pressure inputs. As a result the brine to pure water ratio can be maintained despite an increase in pressure drop in the system as a result of partial fouling of the membrane. Preferably the control valve is set such that there is a 1 to 1 to 2 to 1 brine to purified water ratio through the reverse osmosis system.

A cold water path is also set up through the reverse osmosis vessel. The cold water path is activated by turning on the cold water faucet. When the cold water faucet is turned on, water from the water source is delivered to the reverse osmosis inlet. The water flows through the reverse osmosis vessel and exits the RO brine exit and then flows through a second brine path leading from the reverse osmosis brine outlet to the cold water faucet. When the cold water faucet is turned on, the second brine is the path of least resistance; hence, water does not permeate through the membrane. As a result, water flows along the outside of the membrane without significant migration through the membrane and washes accumulated salts and solids from the membrane to thereby inhibit fouling of the membrane. This results in a prolongation of the life of the membrane.

In another aspect of the invention, a flushable prefilter is used to filter the solids from the source water. According to the invention, the prefilter can be simultaneously flushed along with the reverse osmosis membrane when the cold water faucet is turned on. As a result, the overall reverse osmosis system has a long life with minimal need to change cartridges, filters and membranes.

In another aspect of the invention, the flow rate of brine to the drain is controlled at a predetermined rate over a wide pressure range by using a flow control valve. See for example the flow control valve described in U.S. Pat. No. 4,869,432. Such a valve allows one to maintain a predetermined brine to water ratio despite the increase in pressure drop through the membrane as it gradually becomes fouled. As a result, the low brine to pure water ratio can be maintained over the life of the membrane.

The preferred embodiment of the present invention is illustrated in the following drawings and detailed description of the invention. However, it should be expressly understood that the present invention should not be limited solely to the illustrative embodiment.

DETAILED DESCRIPTION OF THE INVENTION

According to the invention a compact reverse osmosis purification system for supplying purified water to a purified water faucet is supplied in a system which makes use of the cold water faucet and a cold water path as a flushing mechanism for removing salts and other particles trapped on the outside of the reverse osmosis membrane. The resulting system can be efficiently run at a brine to pure water ratio of 2:1 or less and preferably at a ratio of 1 to 1.

A reverse osmosis vessel is provided which includes a reverse osmosis (RO) membrane and a water inlet and a purified water outlet for water exiting the purified water path. Water not permeating through the membrane travels through the reverse osmosis brine path and exits the reverse osmosis brine outlet. Water is supplied to the reverse osmosis unit through a water supply line.

Purified water exits the reverse osmosis purified water outlet and then travels along the purified water path, preferably a conduit or hose leading to a pressurizable purified water storage tank. Desirably the purified water tank is of the bladder type construction. When the tank is filled with water, the bladder expands pressuring the gas between the bladder and the tank wall. The purified water storage tank is connected to the purified water faucet. When the purified water faucet is opened, water is forced from the tank.

A water supply control means is also provided which is responsive to the pressure in the storage tank for controlling the feed of water from the water supply to the reverse osmosis inlet. The water control means preferably a valve is responsive to the water pressure sensed in the storage tank. Desirably when the water pressure in the tank falls below a predetermined level, water is supplied to the reverse osmosis inlet. Preferably the predetermined water pressure level is selected at from one-half to two-thirds of the inlet line pressure.

The brine outlet from the reverse osmosis vessel leads to a first brine path and a second brine path. The first brine path which is activated when the reverse osmosis unit is in the purification mode, connects the brine outlet of the reverse osmosis unit to a drain.

Intermediate the drain and the reverse osmosis brine outlet is a brine flow control valve. Preferably the control valve is set such that there is a 1 to 1 to 2 to 1 brine to pure water ratio through the reverse osmosis system. The brine flow control valve is preferably of the type which allows a constant flow rate therethrough for a variety of inlet pressures. U.S. Pat. No. 4,869,432 which is herein incorporated by reference is an example of such a control valve. Desirably the control valve has a flexible plug having a flexible deformable passageway which can be at least partially closed off in response to inlet pressure to the valve. Consequently, a substantially uniform brine to pure water ratio can be maintained which is substantially independent of the exit pressure of the brine outlet. Such exit pressure can be variable since it is dependent on the supply valve pressure, the extent of fouling of the membrane and the extent to which the storage tank has been filled. Hence, the preselected brine to water ratio can be maintained despite increases in pressure drop through the membrane as a result of partial membrane fouling or as a result of back pressure from the storage tank as it is filled. Desirably as a result of the use of the fast rinse features, the amount of water which is lost down the drain can be controlled and excess water use in violation of the municipal restriction in drought areas can be avoided.

According to the invention a cold water path is provided through the reverse osmosis vessel for delivering source water to the cold water outlet when the cold water tap is activated. The cold water path includes the reverse osmosis inlet and a second brine path which connects the reverse osmosis brine outlet to the cold water faucet. When the cold water faucet is open, the second brine path is the path of least resistance. Hence, no water can permeate through the membrane seeing there is substantially little resistance to the water by following the reverse osmosis brine path and then the second brine path. As a result, water flows along the outside of the reverse osmosis membrane without permeating the membrane and washes accumulated salt and other particulate matter from the membrane to thereby inhibit the fouling of the membrane. This results in a prolongation of the life of the membrane and reduces the need for cartridge replacement or chemical treatment.

Optionally, a flushable particle prefilter is provided to filter particulate matter from the source water. Desirably the prefilter can be simultaneously cleaned with the reverse osmosis membrane when the cold water faucet is turned on. Preferably, the prefilter has two fluid exits, the first exit for fluid passing along the side of the filter and the second exit for fluid passing through the filter. The second outlet is in fluid communication with the water wash the sides of the filter. In the rinse or cold water mode, water will pass along the side of the filter and exit to the cold water path when the cold water faucet is activated. Simultaneously during the cold water cycle, water also passes through the prefilter and is supplied to the reverse osmosis inlet. As described above, such water then flushes the reverse osmosis membrane of accumulated salts. Consequently, the reverse osmosis membrane and the prefilter are simultaneously washed to remove accumulated particles and salts from both the reverse osmosis system and the prefilter to prolong the life of the system.

Figure 1:
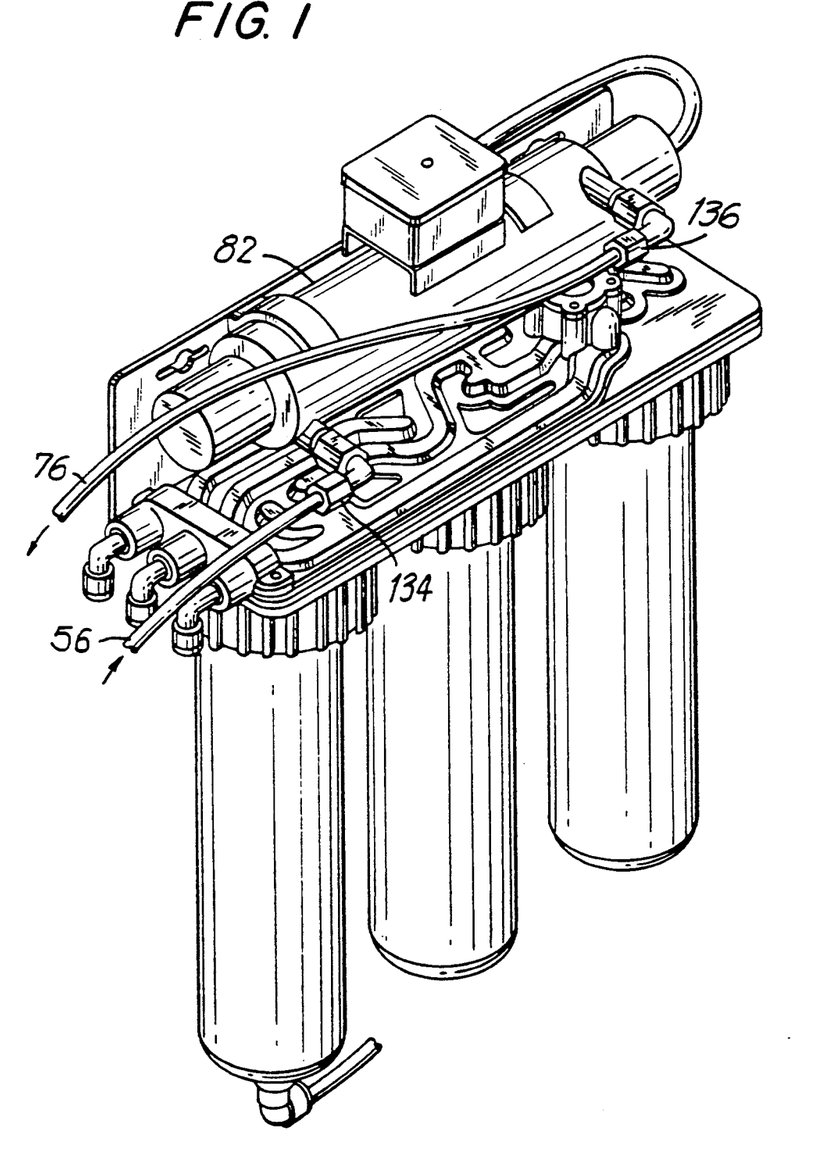
FIG. 1 is a perspective view of Reverse osmosis (RO) water purification system according to the invention.
Figure 2:
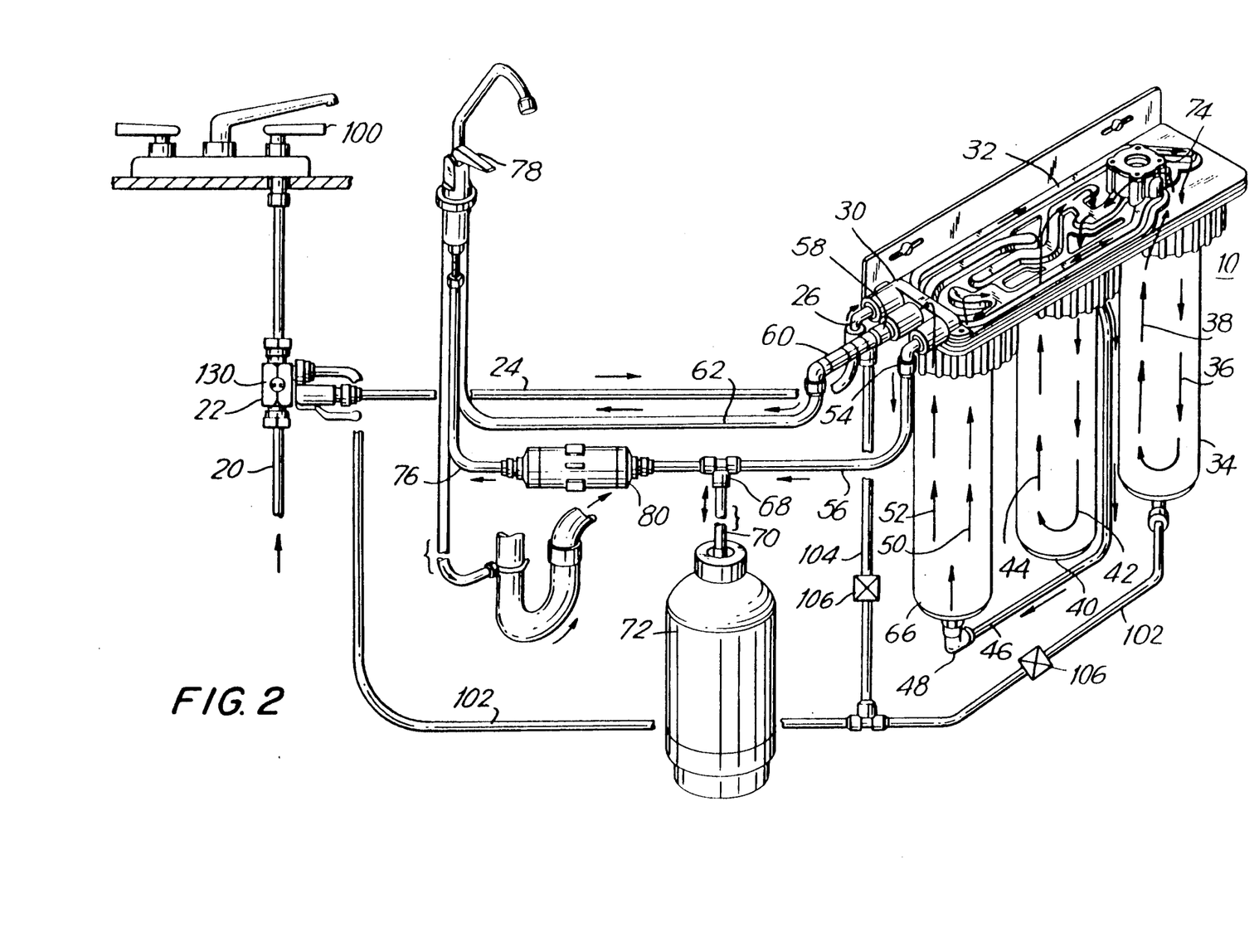
FIG. 2 is a flow diagram of an installed RO water purification device in the water purification mode.

As can be best be seen by referring to FIG. 1 to 2, water is supplied to the reverse osmosis unit 10 from the water source through supply line 20. Block off valve 22 diverts the water from water supply line 20 to inlet line 24 which passes through elbow 26 and union connector 28 to enter the reverse osmosis manifold generally shown as 30. The water then travels along path 32 and enters the particle prefilter cartridge 34 along path 36 shown schematically. The water then passes through the filter and exits along path 38. Optionally the water from path 38 passes through a granular activated charcoal cartridge 40 through path 42 and exits along path 44. If the charcoal filter is not used, the water from the prefilter exit path 38 is directed to RO inlet 48. Optionally, the prefilter cartridge is a flushable filter such as the Sprite F-4000 made by Sprite Ind., Fullerton, Calif. Self cleaning filters such as those described in U.S. Pat. No. 4,714,546 which is incorporated herein by reference are particularly useful as the prefilter. Such filters can have the charcoal filter shown in FIGS. 1 to 3 as 40, as part of the prefilter cartridge 34.

A conduit preferably hose 46 directs the water exiting from path 44 in the charcoal cartridge into the reverse osmosis cartridge 66 through inlet 48. As water travels through the reverse osmosis cartridge 66, a portion of the water permeates through the RO membrane. The resulting purified water exits through RO purified water path 50 and then leaves the RO unit 10 at RO purified water exit 54 and enters purified water line 56. A portion of the entering water does not permeate the membrane 132 and instead flows along the outside of the membrane and along RO brine path 52 to RO brine exit 58 into brine drain line 62 along with contaminents from the source water. Preferably, the RO membrane is cellulose triacetate (CTA) or "thin film composite membrane" (TFC) having a rating of 15 gal/day or higher preferably 15 gal/day to 100/gal day.

Figure 5:
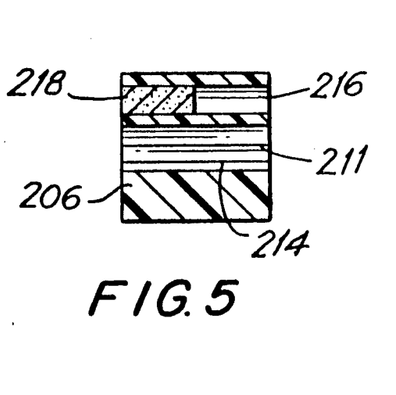
FIG. 5 is an expanded view of brine flow control valve showing the brine flow control plug.

A brine control valve 60 is provided along the brine drain line. As will be discussed in more detail with reference to FIGS. 5 and 6, the control valve 60 preferably has a deformable plug type valve which is better shown and described in FIGS. 5 and 6. Preferably, the control valve 60 is selected so that the ratio of pure water to brine through the reverse osmosis cartridge is from 1:2 to 1:1. Thus, when a RO membrane having a rating of 15 gal/day is used, one would select a control valve having a rating of 15 gal/day to 30 gal/day. Preferably a plug valve of the type described in U.S. Pat. No. 4,869,432 which is hereby incorporated by reference is used as the control valve. In use, brine control valve 60 creates a back pressure on reverse osmosis cartridge 66 such that preferably one gallon of water is purified per every 2 to 3 gallons of water which enters the reverse osmosis purification cartridge.

In operation, purified water leaves the RO cartridge 66 through RO purified water exit 54 along conduit 56 to storage conduit (line) 70 to storage tank 72. A tee 68 is provided along conduit line 56 to direct water to the pure water faucet 78 when the faucet 78 is opened.

Storage tank 72 contains a bladder which creates a back pressure on line 70 when the tank is filled. Thus, as the storage tank 72 fills, the space (not shown) between the bladder and tank inside wall is reduced and the air therebetween is compressed. Shut off valve 74 is set to close when there is sufficient pressure in line 56 as a result of the pressurization of bladder in tank 72. This further entry of water from line 24 will be blocked. Desirably shut off valve 74 is provided to control supply water for purification when the water in storage tank 72 falls below a predetermined amount. Thus, when the pressure in line 70 falls below a predetermined percentage of supply line pressure, preferably from 50 to 75% and most preferably 67%, water is supplied for purification. When purified water faucet 78 is activated, purified water travels through line 70 from tank 72 under the pressure from the bladder to conduit 76 to pure water faucet 78.

Desirably, an inline filter preferably a charcoal filter 80 is provided to filter water after it leaves the storage tank 72. Optionally, as best shown in FIG. 1, an ultraviolet treating station 82 is also provided for treating the purified water after it exits from storage tank 72. In such an embodiment, the water, after it has passed through inline filter 80, is diverted to ultraviolet light treatment station 82 prior to being directed to faucet 78. The water enters UV treatment station 82 through inlet 134 and exits outlet 136. Outlet 136 is connected to line 76 to deliver the UV treated water to the purified water faucet 78. As a result, bacterial and viral organisms are killed which thereby enhances the quality of the water delivered to purified water faucet 78.

Figure 3:
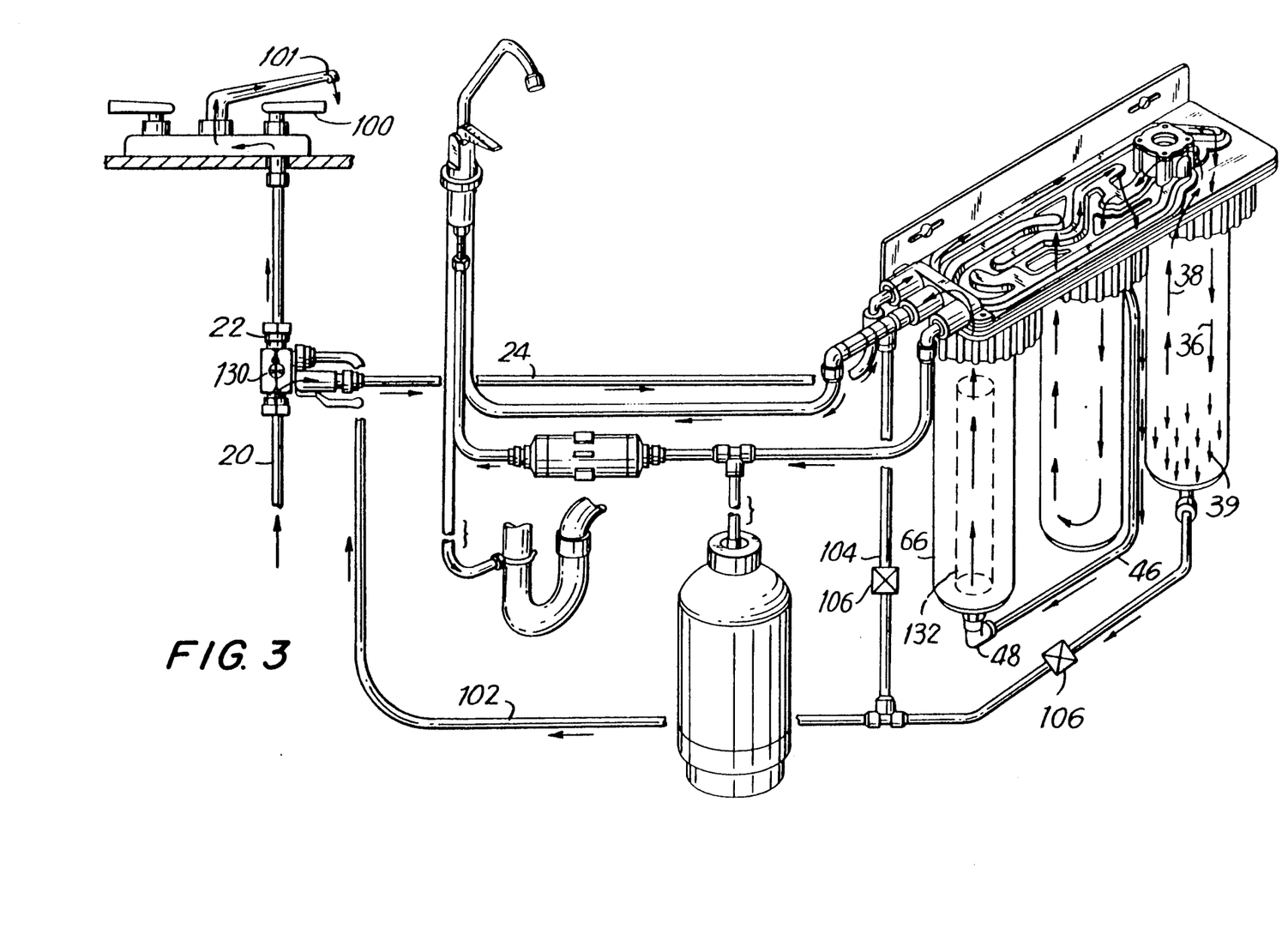
FIG. 3 is a flow diagram of an installed RO water purification system of FIG. 1 in the cold water rinse mode.

As best seen in FIG. 3, the reverse osmosis system of the present invention has a fast rinse feature which enables the operation of the device at a low brine to purified water ratio. According to the invention when the cold water faucet 100 is activated, water travels from supply line 20 to blockoff valve 22 and water inlet line 24 to fast rinse the prefilter in prefilter cartridge 34 and the reverse osmosis membrane 64 to dislodge salts and other solids from the RO membrane 64 and prefilter without the waste of water. It is also diverted through orifice 130 so that flow will not be impeded to the cold water tap. This orifice is a sufficient constriction to force water through the fast rinse circuit.

According to the invention when the cold water is turned on, a second hydraulic path is formed through the system via cold water discharge line preferably conduit 102. Thus, when the cold water faucet 100 is opened, the pressure in line 102 is released and water is drawn through line 24 from water supply line 20. As best seen in FIG. 3, water enters the prefilter cartridge 34 and as a result of the additional hydraulic path, the water flows along two paths: one path 39 down the side of prefilter in cartridge 34 to clean the outside of the filter from built up particles and a second path 36 to 38 through the prefilter to the charcoal filter 40 as in the purification mode. Preferably filter 34 is a self-cleaning dual filtration system such as the Spite F4000. Thus, when the cold water tap is activated the prefilter is rinsed of built up particles which are washed into line 102 which connects to cold water outlet 101.

During the cold water use, the water enters the reverse osmosis cartridge 66 though RO inlet 48 as during the purification mode. As best shown in FIGS. 2 and 3, RO brine outlet 58 directs the brine leaving the RO cartridge 66 to two possible hydraulic paths. The first path extends through control valve 60 and ultimately to brine drain line 62. The second path extends through brine conduit 104 to cold water discharge line 102 which leads to cold water outlet 101. During cold water usage, the hydraulic flow path through conduits 104 and 102 is open to the atmosphere, thus this path is the path of least resistance. Consequently, water does not permeate through the reverse osmosis membrane and instead travels along the outside of the membrane to clean the deposits on the membrane. The water then flows out the brine outlet 58 and follows the path of least resistance to lines 104 and 102.

Preferably check valve 106 along line 104 is provided to prevent any reverse flow of water from line 102 through line 104 and back to the reverse osmosis unit. In operation, when the cold water faucet is turned on, the reverse osmosis and the prefilter cartridge are both rinsed of built up salts and solids without the waste of water. Deposited salts and solids are rinsed from the membrane and prefilter and are delivered to the cold water outlet. Such water can then be used for general business or household purposes such as showers, car washing, gardening and the like.

Figure 4:
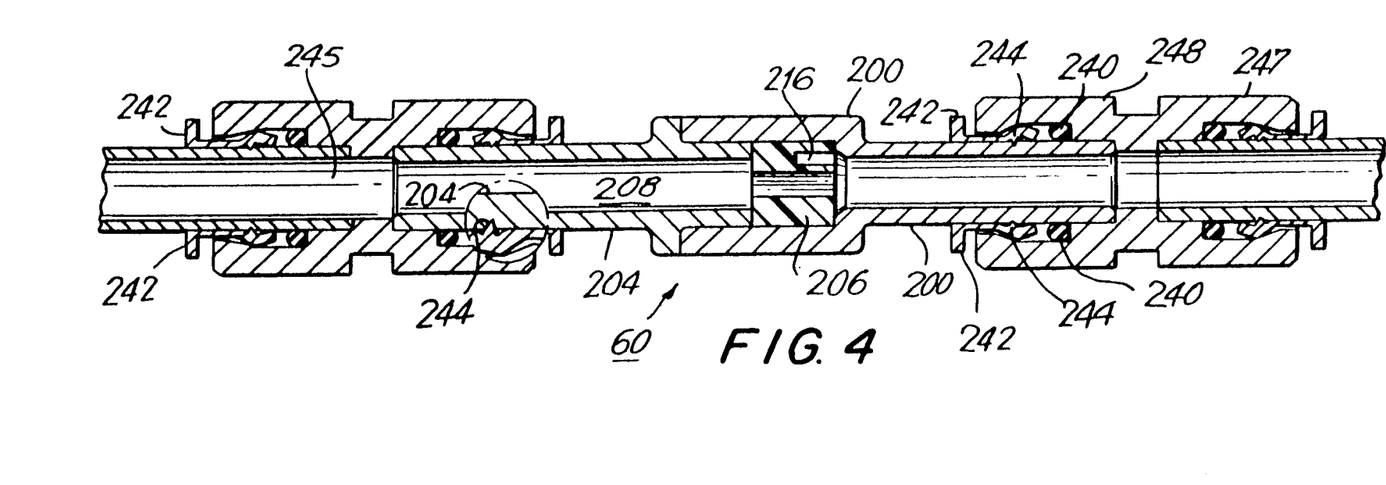
FIG. 4 is a sectional view of the brine control valve assembly showing a brine flow control valve according to the invention.
Figure 6:
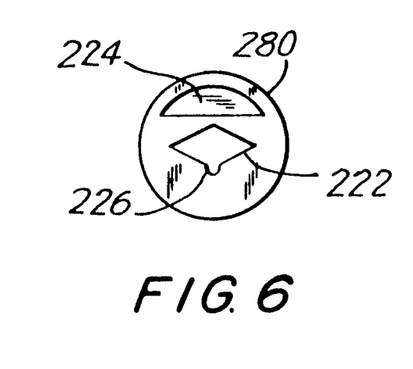
FIG. 6 is an end view of the brine control plug on the inlet side according to the invention.
Figure 7:
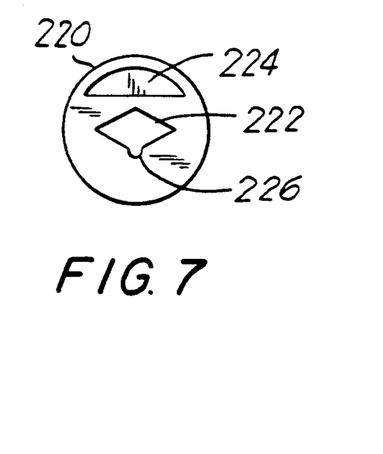
FIG. 7 is an end view of the brine control plug valve on the outlet side according to the invention.
Figure 12:
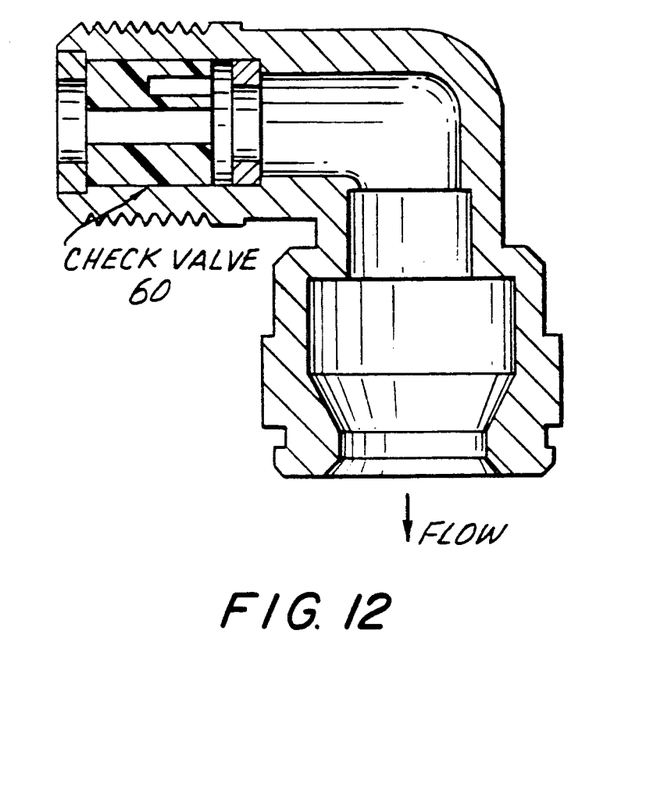
FIG. 12 is a sectional side view of the brine flow control valve operating in the flow control mode mounted in an "elbow fitting".
Figure 13:
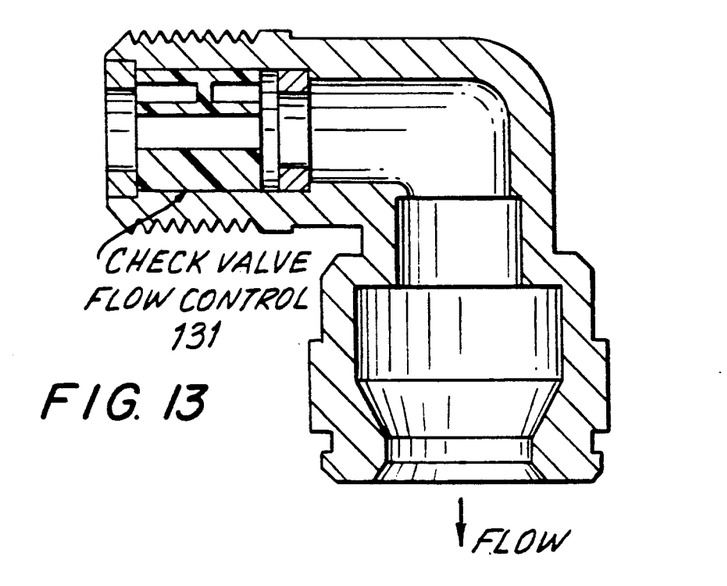
FIG. 13 is a sectional side view of another embodiment of the brine flow control valve according to the invention.

As best seen with regard to FIG. 4, brine control valve 60 preferably includes a cylindrical body 200 having an integral tubular inlet extension 202 and outlet extension 204 which define inlet and outlet passageways 208 and 210 to and from the control valve plug 206 located in the interior of the body 200. Control valve plug 206 is preferably extruded plastic or liquid injection molded which as best seen in FIG. 6 has two passageways therethrough 211 and 214. Preferably a bore 216 is provided on the inlet side of plug 206 in fluid communication with the inlet 210 for a receipt of brine. A plug 218 is preferably formed at the outlet side of bore 216 by filling the outlet of bore 216 with a silicone RTV adhesive and allowing it to solidify. As a result plug 218 blocks water flow therethrough. As shown in FIG. 6, the passageway 211 has a diamond shaped inlet 222. The inlet to bore 224 is preferably moon shaped. Passageway 214 has an inlet, preferably an orifice 226 at the bottom of the diamond shaped inlet 222. Optionally, control valve 60 can be housed in an elbow as shown in FIG. 12.

In operation, when the control valve 60 is under load, water flows through orifice 224 through bore 216. Plug 218 blocks the water and fills the pressure chamber. As a result, the water pressure deforms the diaphragm to force diamond shaped inlet 222 to close and hence, block off passage 211. However, even if inlet 222 is closed, a predetermined amount of water can flow through orifice 226 and passageway 214 so that a controlled amount of brine passes therethrough. When the pressure ceases, the diaphragm deforms so that passageway 214 opens to larger than normal opening allowing a large amount of water through and removing any contaminents collected. Therefore, it is self cleaning. In addition, the amount of brine that travels through orifice is constant for pressures above the "self cleaning" pressure of about 5 to 10 PSI.

Figure 8:
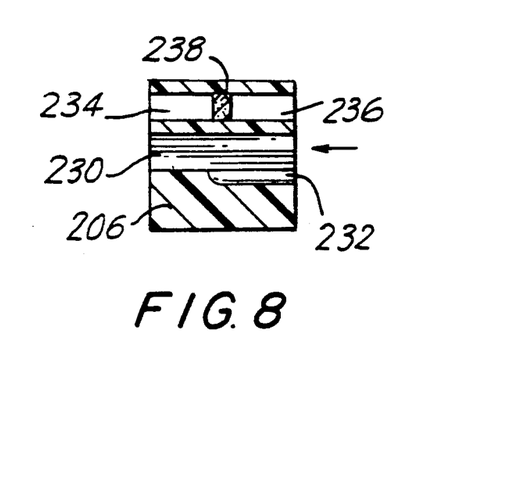
FIG. 8 is a sectional view of the brine flow control plug in the combination flow control and check valve embodiment according to the invention.
Figure 9:
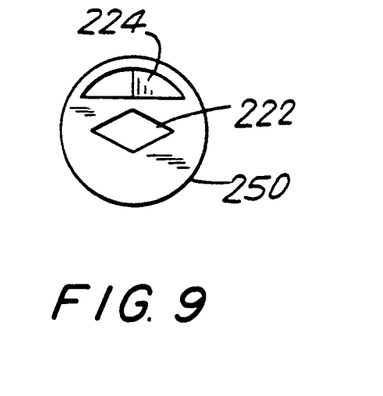
FIG. 9 is a side view of the plug of FIG. 8 on the outlet side according to the invention.
Figure 10:
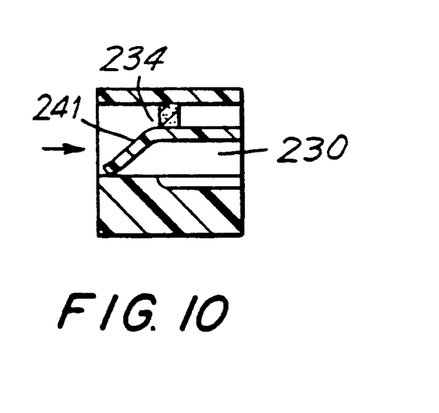
FIG. 10 is a sectional view of the combination control and check valve operating in check valve mode according to the invention.
Figure 11:
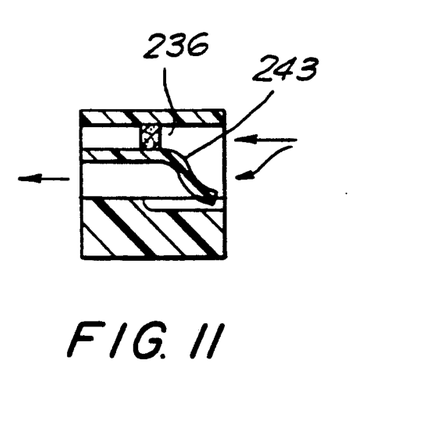
FIG. 11 is a sectional side view of the combination control and check valve operating in the flow control mode according to the invention.

In another aspect of the invention as best seen with regard to the FIGS. 8 through 11, the flow control valve can also double as a check valve to prevent back flow of brine. Thus, as seen in FIG. 8, two passageways 230 and 232 are provided through the plug 206. Passageway 232 however only extends halfway across the plug and then connects with passageway 230. Bores 234 and 236 are provided on either side of the plug 206, a plug 238 is provided to separate bores 234 and 236. In the control valve mode as seen in FIG. 11, fluid enters bore 236 and is stopped by plug 238. The water pressure then deflects the diaphragm so that passage 230 is shut off. However, water can travel through orifice 226 on the side 220 of plug 206 through passageway 232 which then connects to the undeformed back portion of passageway 230 allowing a controlled flow of brine to occur.

As best seen in FIG. 9 in the check valve embodiment, the outlet side of plug 220 has inlets 224 and 222. When back pressure occurs, as shown in FIG. 10, fluid travels through passage 234 (pressure chamber) and deflects the diaphragm to close off passageway 230 and prevent back flow. Since there is no passageway corresponding to 232 on the outlet side of plug 206, there can be no back flow. Hence, the flow control valve functions both as a flow control to regulate the ratio of water purified to brine and in addition acts as a check valve to prevent back flushing of brine into the reverse osmosis unit.

Preferably the brine flow control valve assembly 200 is connected by a connector to the other tubing in the system. Desirably, a connector such as shown in FIG. 4 is provided. The connector 247 has a cylindrical tube receiving portion 245 on either end for receipt of the tubular inlet and outlet extension portions 202 or 204 and the flow control valve 60. The connector includes O rings 240 and collets 242 which have blade like projections 244 which fixedly engage the tubular inlet and outlet extension 202 and 204 of the flow control valve 60 to securely hold the tubular extensions in place. When the collets 242 are pressed towards the connector 248, the cutting edge 244 disengages from the tubes and the tube can be released. Similarly the tubing for the out flow is connected into the other side of such fitting. The resulting connection is easy to maintain and easy to disconnect and provide a leak resistant connection.

The foregoing is considered as illustrative only to the principles of the invention. Further, since numerous changes and modifications will occur to those skilled in the art, it is not desired to limit the invention to the exact construction and operation shown and described above, and accordingly all suitable modifications and equivalents may be resorted to, falling within the scope of the invention.

We claim:

1. A compact reverse osmosis purification system for supplying purified water from an impure water source in conjunction with a cold water outlet comprising:
   A) a reverse osmosis (RO) vessel said reverse osmosis vessel having,
      (i) a RO membrane;
      (ii) a RO water inlet;
      (iii) a RO purified water path for water permeating through said membrane;
      (iv) a RO brine path for water not permeating said membrane;
      (v) a RO purified water outlet for water exiting said purified water path;
      (vi) a RO brine outlet for brine exiting said RO brine path;
   B) water supply means to supply impure source water to said RO water inlet for purification;
   C) a pressurizable purified water storage means, the pressure of said storage being a function of the amount of purified water contained in said tank;
   D) water supply control means responsive to the pressure in said storage tank for controlling the feed water from the water supply means of (B) to said RO inlet when the pressure in said storage tank falls below a predetermined level;

E) a purified water faucet;

F) a purified water path connecting said purified water outlet to said water storage tank and said water storage tank to said purified water faucet;

G) means to deliver said purified water to said purified water faucet from said storage means;

H) a first brine path connecting said brine outlet to a drain;

I) a brine flow control valve located on said first brine path, said brine flow control valve located intermediate said brine outlet and said drain for regulating the ratio of brine to pure water;

J) a cold water path for delivering impure source water to said cold water outlet when said tap is activated; said cold water path including:
 (i) means to deliver said source water to said RO inlet prior to delivery to said cold water outlet when said cold water faucet is activated;
 (ii) a second brine path connecting said RO brine outlet to said cold water faucet;
 (iii) means to direct said brine through said second brine path when said cold water faucet is activated;
 (iv) means to selectively direct source water through said RO brine path when said cold water faucet is activated to remove accumulated salts along said membrane without said source water permeating said membrane;
 whereby accumulated salts are removed from said membrane without water waste down the drain.

2. The compact reverse osmosis purification system of claim 1 wherein said pressurizable purified water storage means includes an expandable bladder for retaining said pure water under pressure and delivering said pure water on demand to said pure water faucet.

3. The compact reverse osmosis purification system of claim 2 wherein the ratio of brine to pure water regulation by the brine flow control valve is from 2:1 to 1:1.

4. The compact reverse osmosis purification system of claim 3 further comprising:
a particle filter cartridge located intermediate said water supply means and said reverse osmosis vessel;
said particle filter cartridge having a particle filtered water inlet;
a particle filtered water outlet a cold water outlet, and particle filter;
a first connection means to connect said filtered water outlet to said RO outlet inlet;
a second connection means to connect said prefilter cartridge inlet to said water supply means;
a third connection means to connect said cold water outlet to said cold water path at a point intermediate said RO brine outlet and said cold water outlet;
said prefilter cartridge having a filtered water path wherein supply water enters said prefilter inlet, and passes through said filter;
a rinse path wherein supply water flows down the side of said filter to dislodge solid particles from said filter;
means to simultaneously direct water through said filtered water path and said rinse path when said cold water faucet is activated.

5. The compact reverse osmosis purification system of claim 4 further comprising:
a charcoal filter having a charcoal filter inlet and a charcoal filter outlet said charcoal filter located intermediate said filtered water outlet and said RO water inlet;
a first connection means to connect said charcoal filter inlet to said particle filter outlet,
a second connection means to connect said charcoal filter outlet to said RO inlet.

6. The compact reverse osmosis purification system of claim 5 further comprising:
ultraviolet treatment means for treatment of purified water;
means to connect said ultraviolet treatment means to said purified water storage means so that said purified water flows through said ultraviolet treatment means prior to delivery to said purified water faucet.

7. The compact reverse osmosis purification system of claim 6 further comprising:
charcoal filter means located between said water storage means and said purified water faucet.

8. The compact reverse osmosis purification system of claim 3 wherein said brine flow control valve includes means to maintain a substantially constant brine flow over the pressure range encountered in said first brine path whereby a constant brine to water ratio can be maintained despite variations in pressure in said first brine path.

* * * * *